(12) United States Patent
St. Vrain

(10) Patent No.: US 7,028,012 B2
(45) Date of Patent: Apr. 11, 2006

(54) SYSTEM AND METHOD FOR ORDERING CUSTOMIZED IDENTIFICATION DOCUMENTS VIA A NETWORK

(75) Inventor: Kent Carlyle St. Vrain, Lunenburg, MA (US)

(73) Assignee: Polaroid Corporation, Waltham, MA (US)

( * ) Notice: Subject to any disclaimer, the term of this patent is extended or adjusted under 35 U.S.C. 154(b) by 695 days.

(21) Appl. No.: 09/774,762

(22) Filed: Jan. 31, 2001

(65) Prior Publication Data

US 2001/0037309 A1    Nov. 1, 2001

Related U.S. Application Data

(60) Provisional application No. 60/179,355, filed on Jan. 31, 2000.

(51) Int. Cl.
G06F 17/60    (2006.01)

(52) U.S. Cl. ............................ 705/64; 705/62; 705/58; 705/53; 705/55; 705/1

(58) Field of Classification Search .................. 705/1, 705/64, 62, 58, 53
See application file for complete search history.

(56) References Cited

U.S. PATENT DOCUMENTS

| | | | |
|---|---|---|---|
| 5,029,099 A | 7/1991 | Goodman | 364/479 |
| 5,036,472 A | 7/1991 | Buckley et al. | 364/479 |
| 5,111,392 A | 5/1992 | Malin | 364/401 |
| 5,383,111 A | 1/1995 | Homma et al. | 364/401 |
| 5,440,479 A | 8/1995 | Hutton | 364/401 |
| 5,513,117 A | 4/1996 | Small | 364/479 |
| 5,544,062 A | 8/1996 | Johnston, Jr. | 364/468.24 |
| 5,546,316 A | 8/1996 | Buckley | 364/479.03 |
| 5,860,068 A | 1/1999 | Cook | 705/26 |
| 5,930,768 A | 7/1999 | Hooban | 705/27 |
| 5,987,132 A | 11/1999 | Rowney | 380/24 |
| 5,993,048 A | 11/1999 | Banks | 364/479.03 |
| 5,999,908 A | 12/1999 | Abelow | 705/1 |
| 6,658,394 B1 * | 12/2003 | Khaishgi et al. | 705/58 |

FOREIGN PATENT DOCUMENTS

JP    2005141565    * 11/2003

OTHER PUBLICATIONS

Electronic commerce http://www.dod.mil/dfas/ecedi/ Mar. 5, 2005.*

* cited by examiner

Primary Examiner—Pierre Elisca
Assistant Examiner—John M. Winter

(57) ABSTRACT

A system and method for using an e-commerce system to provide a user with the ability to order customized identification documents over the Internet is provided. The user can customize the layout of the identification document, including the use of company logos and trademarks. The user provides the demographic data and corresponding graphical representations, and is given the opportunity to approve a digital facsimile of the identification document that will be produced by the service bureau prior to the production of the identification documents. In addition, enhanced security is provided by verifying that the user is part of a legitimate organization and is authorized to use the identification documents being ordered.

14 Claims, 15 Drawing Sheets

SYSTEM AND METHOD FOR ORDERING CUSTOMIZED IDENTIFICATION DOCUMENTS VIA A NETWORK

REFERENCE TO RELATED APPLICATIONS

The present application is a non-Provisional application and claims the benefit of Provisional U.S. patent application Ser. No. 60/179,355, filed Jan. 31, 2000.

FIELD

This invention in general relates to the field of identification documents and, in particular, to a secure method for generating and ordering customized identification documents over a network such as the Internet.

BACKGROUND

Although, many national governments and government agencies throughout the world, and many commercial enterprises, have long understood the value and necessity of secure identification documentation, many smaller commercial enterprises and smaller government agencies have not appreciated that need. Recent events throughout the world such as terrorist attacks, workplace shootings, school shootings, workplace fraud and other criminal activities have heightened the sensitivity of many of these smaller organizations to the importance of security and the need for identification documents to restrict access to facilities to authorized individuals.

Many medium to large organizations have utilized identification badging systems to help alleviate the danger present to their employees or citizens through the unauthorized access to peoples homes or workplace by using false identification documents. These systems, however, are often prohibitively expensive for smaller organizations. At present, there are more than 6.4 million organizations in the United States that employ fewer than 100 persons. Collectively, these organizations employ over 56 million people. Although these smaller organizations desire professional looking identification documents for their employees, many of these organizations cannot justify the purchase price of several thousand dollars for identification badging systems.

In addition, currently smaller organizations may be limited in choice to stock identification badge layouts, sizes, and colors. While larger organizations may not mind using a standard badge design, smaller organizations looking for their own identity may find it advantageous to have custom designed identification documents.

In addition, the possible illegal use of identification documents remains a concern. Teenagers seeking to obtain alcohol and the concomitant increase in the danger of driving drunk is one possible scenario. Another, is where individuals obtain counterfeit identification documents identifying themselves as employees of a local utility company to gain unauthorized access to residences or businesses. Also, companies are more concerned with maintaining security to protect themselves from economic espionage from their competitors. Preventing unauthorized individuals from accessing secure areas can frustrate certain forms of economic espionage.

In light of the above, a system is desired that allows an organization to purchase identification documents on-line without the need for purchasing expensive equipment, that provides an option for the organization to customize their own identification badge design, and that provides a level of security by authenticating purchasers of said identification card.

SUMMARY

The present invention discloses a system for ordering an identification document via a network that includes a user interface connected to the network, the user interface being configured to provide communication between the user and a server coupled to the network. A data gathering module is coupled to said server and is configured and arranged to prompt the user to provide at least one demographic data and a corresponding graphical representation. This data is securely stored in a user demographic and picture database that is also coupled to the server. An identification document design module is coupled to the server and is configured to provide identification document design guidance data to the user, and to receive from the user identification document design data. This design data is securely stored in a document design database coupled to the server. A payment module is coupled to the server and is configured to prompt the user to provide a payment data. This payment data is securely stored in a user payment data database coupled to said server. The payment data can include payment data relevant and for example can include the location of the user. This payment data is used to verify that a payment has occurred, upon when the payment module generates and provides a paid-in-full signal. A service bureau is coupled to the server and is responsive to the paid-in-full signal. When the paid-in-full signal is received, the service bureau retrieves from said user demographic and picture data base the demographic data and said corresponding graphical representation and retrieves from the identification document design data database the stored design data, and produces the identification document incorporating said at least one demographic data and said corresponding graphical representation and said identification document design data. A user verification module is coupled to said server, wherein said user verification module retrieves said location of said user and verifies that said user is a legitimate organization and generates a user verified signal, upon which, the service bureau is responsive to this signal. It is therefore a necessary condition of identification for the service bureau to receive the user verified signal to retrieve from the user data base the demographic data and the graphical data. A user approval module is coupled to the server and is configured and arranged to create a facsimile to the user via the server and the network. The user is then prompted to provide a job-acceptance signal if the facsimile is acceptable to the user, wherein if the user approval module receives the job-acceptance signal, said user approval module instructs the service bureau to produce an identification document equivalent to said facsimile.

In one embodiment, the data gathering module, the identification document design module, the payment module, the service bureau, and the user verification module can be coupled to the server by one of the following groups consisting of an Internet network connection, an Intranet network connection, and a dial-up modem connection.

In an alternative embodiment, the data gathering module, the identification document design module, said payment module, said service bureau, said user verification module, and said user verification module each include a plurality of computer processor instructions that can be executed by one of the following groups consisting of a computer processor located within said server and at least one processor remote from said server.

In another embodiment, the plurality of computer processor instructions can be compiled instructions written in one of the following group of computer languages consisting of C, C++, and Java.

In another embodiment, the plurality of computer processor instructions can be interpreted instructions written in one of the following group of computer languages consisting of visual basic, Java script, CGI script.

In another embodiment, the demographic data can include the name of an employee, the name of a company, the employee number, the address of a company, the telephone number of a company and a security clearance level.

In another embodiment, the corresponding graphical representation can include a digitally encoded picture or a digitally encoded fingerprint.

In another embodiment, when data is securely stored, the demographic data and the corresponding graphical representation are encrypted using a password to generate a plurality of password encrypted data.

In another embodiment, the identification document design guidance data includes a plurality of data including: identification document orientation data, where the orientation data includes portrait and landscape orientations; location data for placement of the graphical representation on the identification document; location data, orientation data, font data, and font size data for placement of the at least one demographic data on the identification document; a plurality of special printable indicia of security clearance level data; and data for printing on both sides of said identification document.

In another embodiment, the payment data can include a shipping address; a credit card information; debit card information; electronic transfer authorization information; and a purchase order number.

In another embodiment, the user verification module can include a database containing a plurality of business addresses and corresponding telephone numbers, wherein said location of the user is cross-checked with said business address and telephone numbers in the data base.

In another embodiment, the system can also include a security feature design module that is coupled to the server and is configured and arranged to provide the user with security feature design guidance data. The user is prompted to provide security feature design data for security features that are to be included in the identification document. This security feature design data is securely stored in a user security feature database. The security feature design guidance data can include: data directed to encoded magnetic stripes printed on said identification document; data directed to a one-dimensional bar code printed on said identification document; data directed to a two-dimensional bar code printed on said identification document; data directed to micro-printing one or more characters on said identification document; data includes data directed to one or more UV visible security features printed on said identification document. The security feature design data can be securely stored in a password-encrypted file.

In another embodiment, the system can include a user registration module that is coupled to the server and is configured and arranged to query the user to provide user data, and to receive the user data and to securely store said at least one user data in a secure user identification document data database. The user data can include the name of the user; the name of a company associated with the user; the location of the company associated with the user; the telephone number associated with the user; the email address associated with the user.

A secure method is also provided for a user for generating and ordering customized identification documents over a network. The method comprises the steps of providing to and receiving from the user a plurality of badge design guidance data that is securely stored. The method provides prompting and receiving from the user demographic data and graphical representation data corresponding to the demographic data to be incorporated into the identification document incorporating the plurality of design badge data and including the demographic data and corresponding at least one graphical representation. The method further creates a facsimile, and prompts and receives from the user to approve or not approve the facsimile. If approval is received and payment data is not stored, the user is prompted for payment and location information and payment data including the shipping location and verifies that the payment and location information is a legitimate organization. In addition, if approval is received and the user is verified as being legitimate then the method verifies that a payment for the identification document has occurred, if a payment is verified, then the identification document is manufactured corresponding to the approved facsimile and delivered to the location.

In another embodiment, the method can also include the steps of providing the user with a user id and password and prompting the user to provide at least one user data. The data received from the user is then securely stored.

In another embodiment, the setup of verifying that the location is a legitimate organization can include, retrieving said location information; cross checking said location information with a database of known legitimate organizations.

In another embodiment, the method can also include the steps of providing the user with a plurality of security feature design guidance data, receiving security feature design data from the user and securely storing the security feature design data.

Thus, the claimed invention provides the advantages over the prior art that include, an efficient and less expensive method of providing identification documents, that can be custom designed, and that provide a higher degree of security.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DETAILED DESCRIPTION

This invention generally relates to the field of manufacturing identification documents ordered via a network by a user, where the user can customize and design their identification documents, the user can preview and approve a facsimile of the identification documents prior to payment, and where the user is verified as a legitimate organization prior to producing and shipping the identification documents. In particular, the invention relates to methods and systems that allow a user to specify and customize an identification document, provide demographic data and corresponding graphical representations to be printed or placed on the surface of the identification documents, preview a facsimile of the actual identification documents prior to payment, and be verified as a legitimate user of the identification documents. Once the payment has been accepted, the physical cards are then produced and shipped or delivered to the user. A number of different embodiments are described which have utility in their own right but are also combined with other inventive features for producing identification documents, and other purposes, as will become evident.

As used herein, identification documents can be, without limitation, identification cards and badges, or larger documents some of which may have multiple pages such as a passport.

Figure 1:
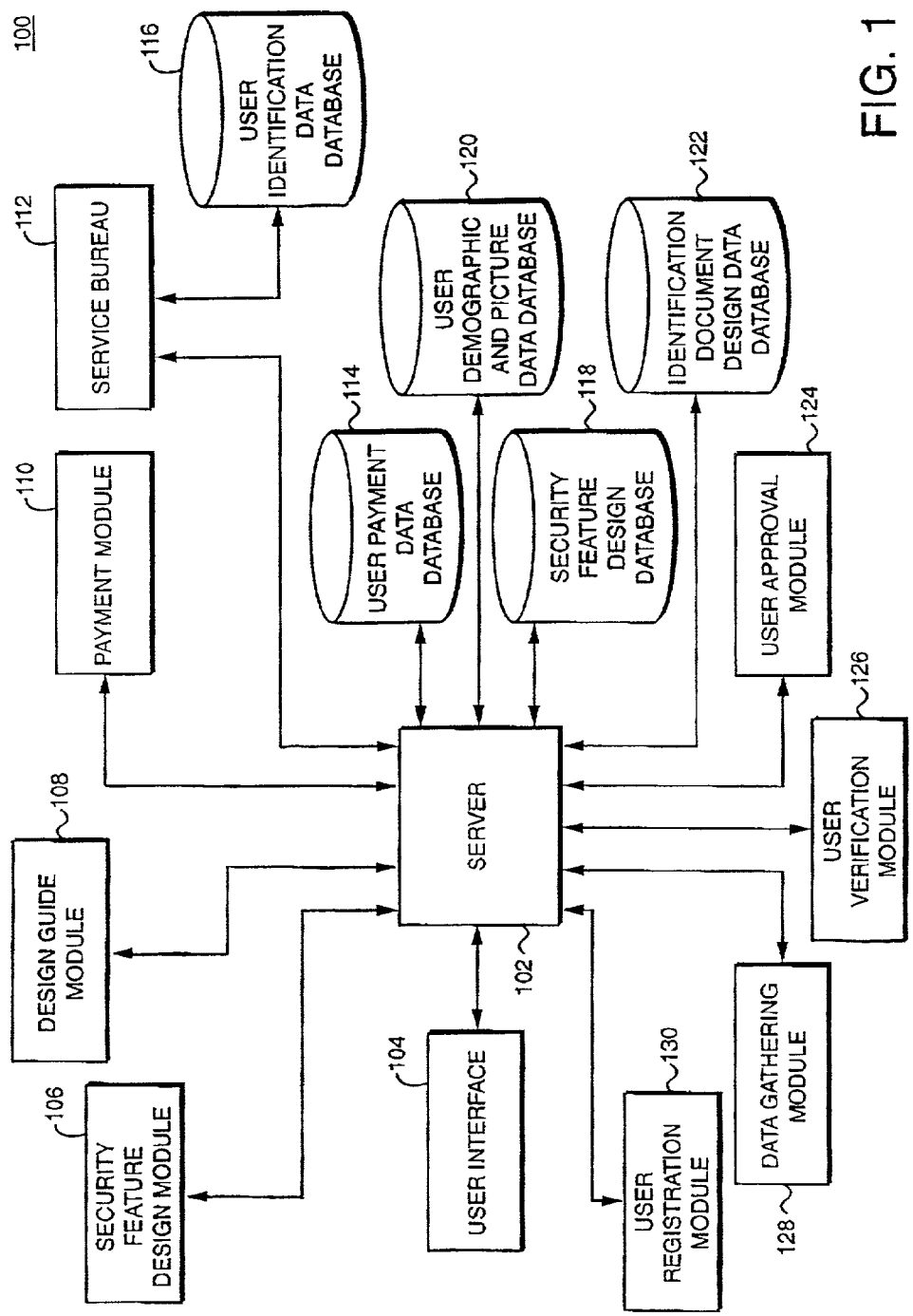
FIG. 1 is a block diagram illustrating one embodiment of the present invention.

There is shown in FIG. 1 a block diagram of one embodiment of the apparatus for specifying and producing identification documents according to the present invention. As shown in FIG. 1, a system 100 for specifying and producing at least one identification document is shown. System 100 comprises user interface 104 coupled to server 102. User interface 104 provides communication between the user and the server 102. User interface 104 is preferably a general purpose personal computer with application programs capable of interfacing to the Internet and displaying graphics and text. In another embodiment user interface 104 may be a web machine constructed to specifically interface with the Internet and display graphics and text. Data gathering module 128 is coupled to server 102 and, as will be explained in more detail below, prompts the user to provide the demographic data and corresponding graphical representations that will be printed or placed on the surface of the identification documents. In addition, data gathering module 128 will securely store the demographic data and corresponding graphical representations received from the user in user demographic and picture data database 120. Identification document design guide module 108 is coupled to server 102 and is configured and arranged to provide the user with identification document design guide data. As will be explained in more detail below, identification document design guide module 108 provides the user with data concerning the layout, orientation, and the look and feel of the identification document in general. In addition, the identification document design module 108 receives from the user identification document design data and securely stores this data in an identification document design data database 122 coupled to server 102. Payment module 110 is coupled to server 102 and is configured to prompt the user to provide payment data with regard to the purchase of identification documents. In addition, payment module 110 will securely store the user's payment data in user payment data database 114 and user registration module 130 will securely store the user's identification data in user identification data database 116. Service bureau 112 is coupled to server 102 and to the secure user identification document database 116.

Service bureau 112 is responsible for producing and manufacturing the identification documents. As will be explained in more detail below, service bureau 112 will manufacture and produce identification documents only under certain specified conditions that ensure that the identification documents have been paid for and the user purchasing the documents is part of a legitimate organization. User verification module 126 is coupled to server 102 to verify that the location, or shipping location, provided by the user is in fact a legitimate organization, upon which it produces a user-verification signal. User approval module 124 is coupled to server 102 and is configured and arranged to provide a facsimile of a finished identification document containing the user provided demographic data and corresponding graphical representations. User approval module 124 prompts the user to provide an indication of the acceptability of the facsimile of a finished identification document and produces a job-acceptance signal. As will be explained in more detail below, the user may inspect one or all of their identification documents and if satisfied will provide a job-acceptance signal that is received by user verification module 126 and provided to service bureau 112.

Server 102 is a powerful computer that can act as an interface between other computers running various applications and the Internet. Server 102 will often connect through other routers and servers (not shown) across the Internet to the destination address, which is often another computer running various application programs.

In one embodiment user interface 104, identification document design module 108, payment module 110, service bureau 112, user approval module 124, user verification module 126, data gathering module 128, can be application programs running on processors or computers that are remote to server 102 and can be coupled to server 102 through an Internet network connection, an Intranet network connection, or a dial-up modem connection. Server 102 will control the various distributed processors and computer applications through its own operating system and computer applications.

In one embodiment, user interface 104, identification document design module 108, payment module 110, service bureau 112, user approval module 124, user verification module 126, data gathering module 128, can be application programs running locally on server 102 under control of server 102's operating system.

The choice of a distributed processor architecture or a local architecture, or a combination thereof is to be based on economic and logistical considerations and is considered to be within the skill of one of ordinary skill in the art.

In one embodiment application programs contained in user interface 104, identification document design module 108, payment module 110, service bureau 112, user approval module 124, user verification module 126, data gathering module 128, are a plurality of computer processor constructions that can be compiled in any high level language such as Java, C, C++. In addition, the plurality of computer instructions may be interpreted in a high level language such as Visual Basic, Java Scripting Language, or CGI Script.

The choice of a particular language whether compiled or interpreted for the plurality of applications, or a combination thereof is to be based on economic and logistical considerations and is considered to be within the skill of one of ordinary skill in the art.

As discussed previously, data gathering module 128 prompts the user to provide the demographic data and corresponding graphical representations that will be printed or placed on the surface of the identification documents. The demographic data can include any information that an organization desires. In a preferred embodiment, no data relating to the age or birth date of the user will be printed on the identification document. This is to avoid illegitimate users attempting to obtain identification documents that are to be used illegally as fake IDs. In what is not to be considered in any way as limiting, other demographic data that can be printed on identification documents can include: an employee name, a company name, an employee or badge number, an address of the Company, the telephone number of the Company or employee, company logo and trademarks, and security clearance level. A user would be free to include other demographic data than that listed above, and the selection of other demographic data considered to be within the skill of one of ordinary skill in the art.

The graphical representation that corresponds to the demographic data received from the user can include a visual image of the person for whom the identification document is made. The visual image can be obtained in one embodiment by the use of digital camera that can provide a digitally encoded picture and in another embodiment by the use of a traditional film camera to produce a picture and a scanner to provide a digitally encoded picture. In another embodiment, the graphical representation may be a fingerprint or thumbprint of the person for whom identification document is made. Other graphical representations that can be used for identification may be selected by the user and would be considered to be within the skill of one of ordinary skill in the art.

Figure 2:
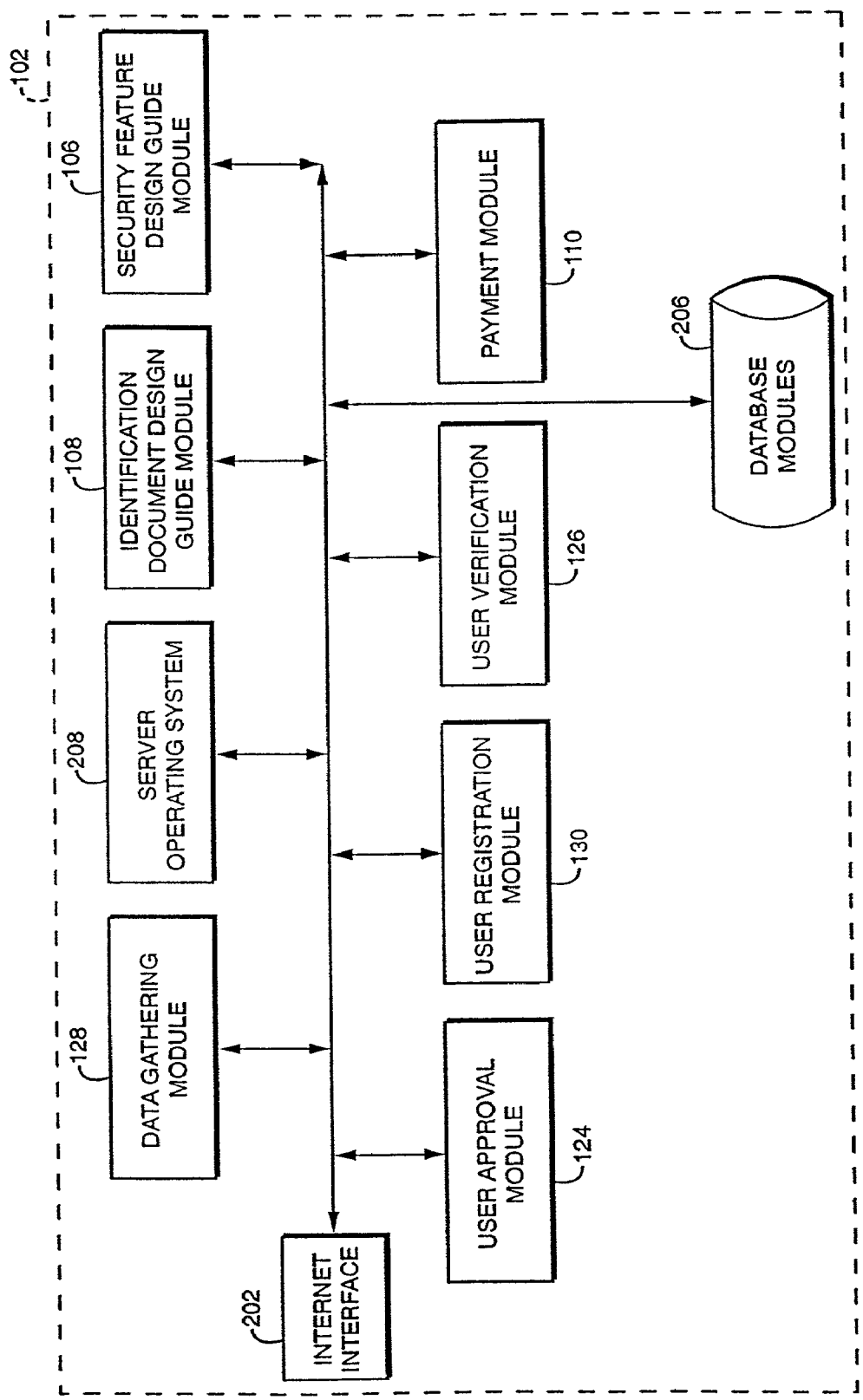
FIG. 2 is a block diagram illustrating a second embodiment of the present invention.

FIG. 2 illustrates a second embodiment in which all of the modules are contained in server 102 itself under the control of the server operating system 208. Each module may be a separate application file resident on one or more hard drives, compact disks, or other non-volatile memory. All of the communications via the Internet are handled by Internet interface 202, and the separate modules communicate by bus 204. In addition, all the database modules may be resident in one database module 206 resident within server 102. Alternatively, each module may be a "virtual machine" in which each module is under the control of its own operating system, with overall coordination being handled by server operating system 208.

Figure 3:
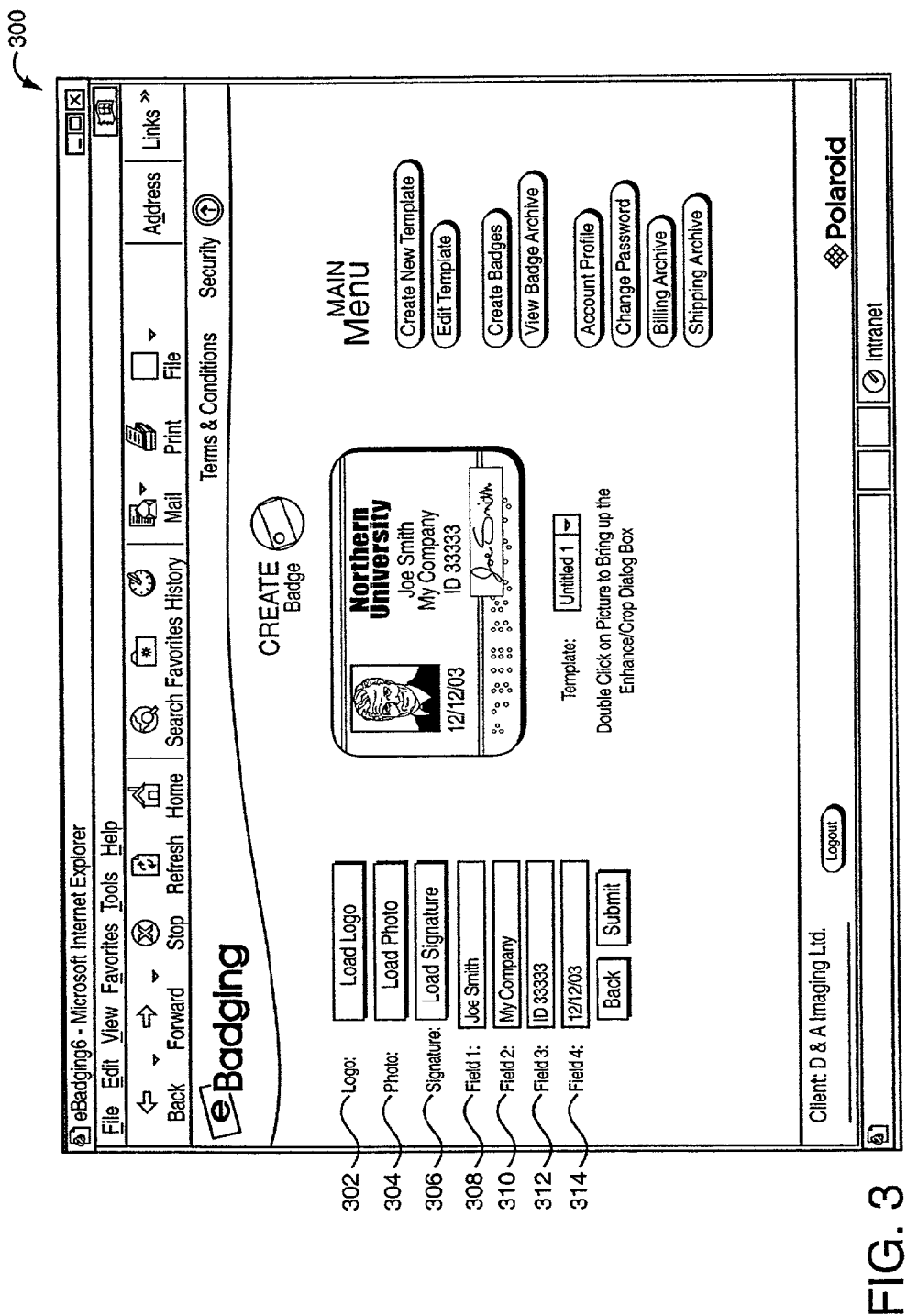
FIG. 3 is an exemplary web page illustrating the data entry format in the data gathering module.

FIG. 3 illustrates a Web page 300 that may be used to collect demographic data and graphical representation data that will be printed or placed on a surface of identification document. Switch 302 will load a company or corporate logo from a specified file location. Switch 304 will load the graphical representation, which in the illustrative embodiment is a photo, from a specified file location. Switch 306 will load a signature that has been captured electronically from a specific file location. Switches 308–314 corresponds to berries data field selected by the user. The illustrative embodiment fields include the name of the employee, the name of the Company, the employee identification document number, and the expiration date of the identification document.

As discussed above, several of the modules provide the secure storing of various types of user data, like: user payment data, user demographic and corresponding graphical representation data; user verification data; user identification document design data and user security feature design data. As used herein, securely storing data means to encrypt the data so as to resist unauthorized access or tampering thereof. In one embodiment, all securely stored data is encrypted using a password generated by the user, and known only to the user. As would be obvious to one of ordinary skill in the art, various methods of encryption could be used. In one embodiment SSL can be used to encrypt data using a password, but other methods are clearly anticipated. Any private key or public/private key encryption can also be used to protect the data.

Service bureau 112 may be a fully automated or semi automated facility for printing and laminating identification documents. In one embodiment, service bureau 112 produces identification badges or cards. In this embodiment, an operator may monitor the production process, perhaps selecting individual jobs of cards to be manufactured, but once the manufacturing process has begun the process is nearly entirely automatic. Sheets of identification badge stock (not shown) are fed into a computer controlled printing system (not shown). The computer controller retrieves the demographic data and corresponding graphical representations, the card design data, and any other user selected features and will combine this data to print the plurality of desired cards on each sheet of the identification card stock. This printed material can be automatically laminated and automatically cut into individual identification badges. In a preferred embodiment regular identification badge stock may be used. This type of stock is not typically preprinted and is cheaper than preprinted identification badge stock. By not using preprinted identification badge stock a plurality of identification documents each for a different user, or company, or division or location within a company may be printed on each sheet without having to stop the process to load special identification badge stock. This has the effect of increasing the efficiency of reducing the cost of each identification document. It would be obvious however to allow semiautomatic processing of identification badges where the operator is instructed to load specific pre-printed identification stock where a user has requested this for a specific job. In one embodiment service bureau 112 may automatically generate the e-mail message to the user when the identification badges are complete and ready to be shipped. Shipping and delivery to the user from service bureau 112 may be by any conventional method.

As discussed above and with reference to FIGS. 3, 4, 5, and 6 identification document design guide module provides identification document design guidance data to the user.

Figure 4:
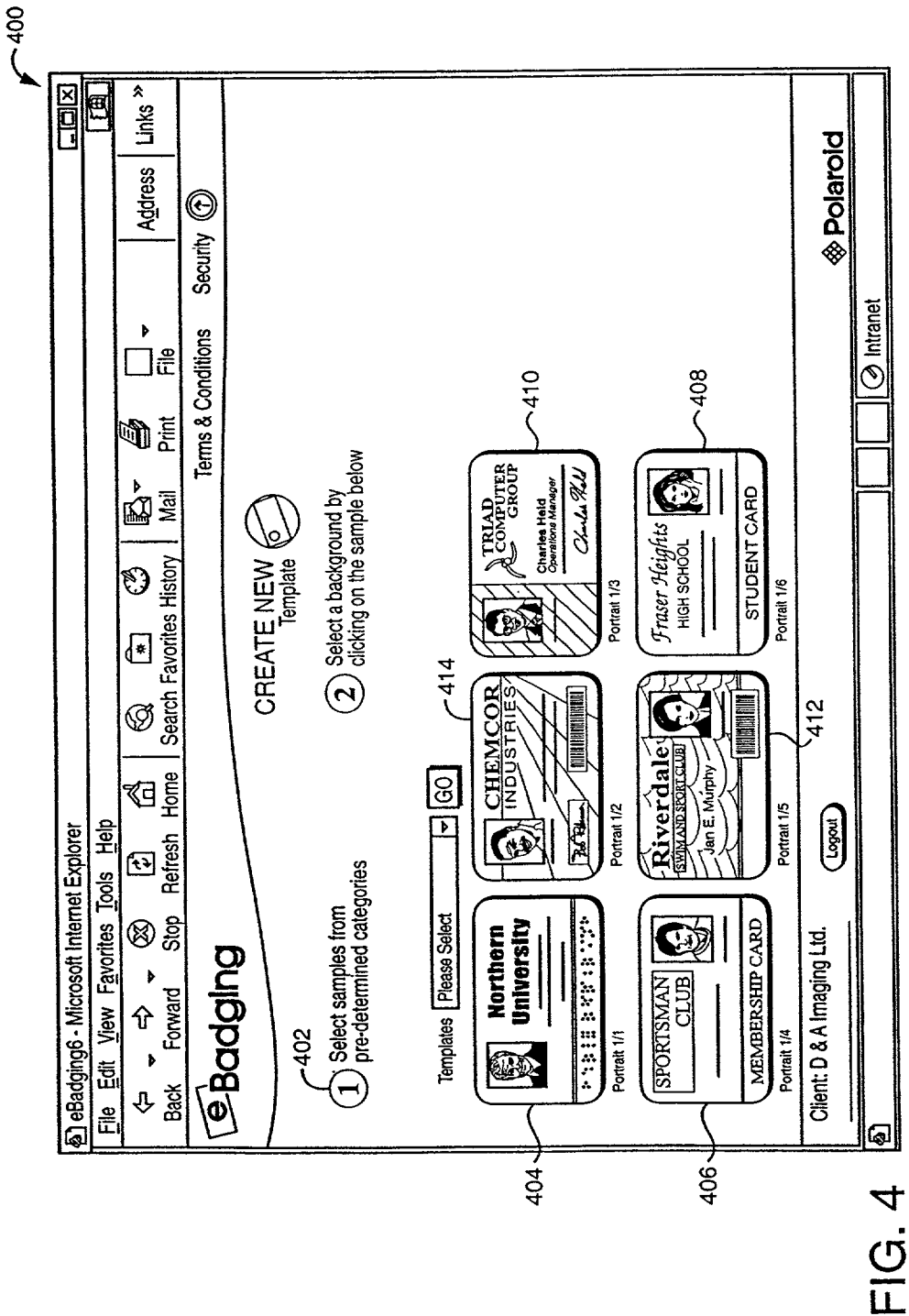
FIG. 4 is an exemplary web page illustrating various templates available in the data gathering module.

FIG. 4 shows a web page 400 illustrating various font types and font sizes for the various data fields that can be selected by the user. In addition, a color patch or other color field (not shown) may be used to represent various levels of security clearance.

Figure 5:
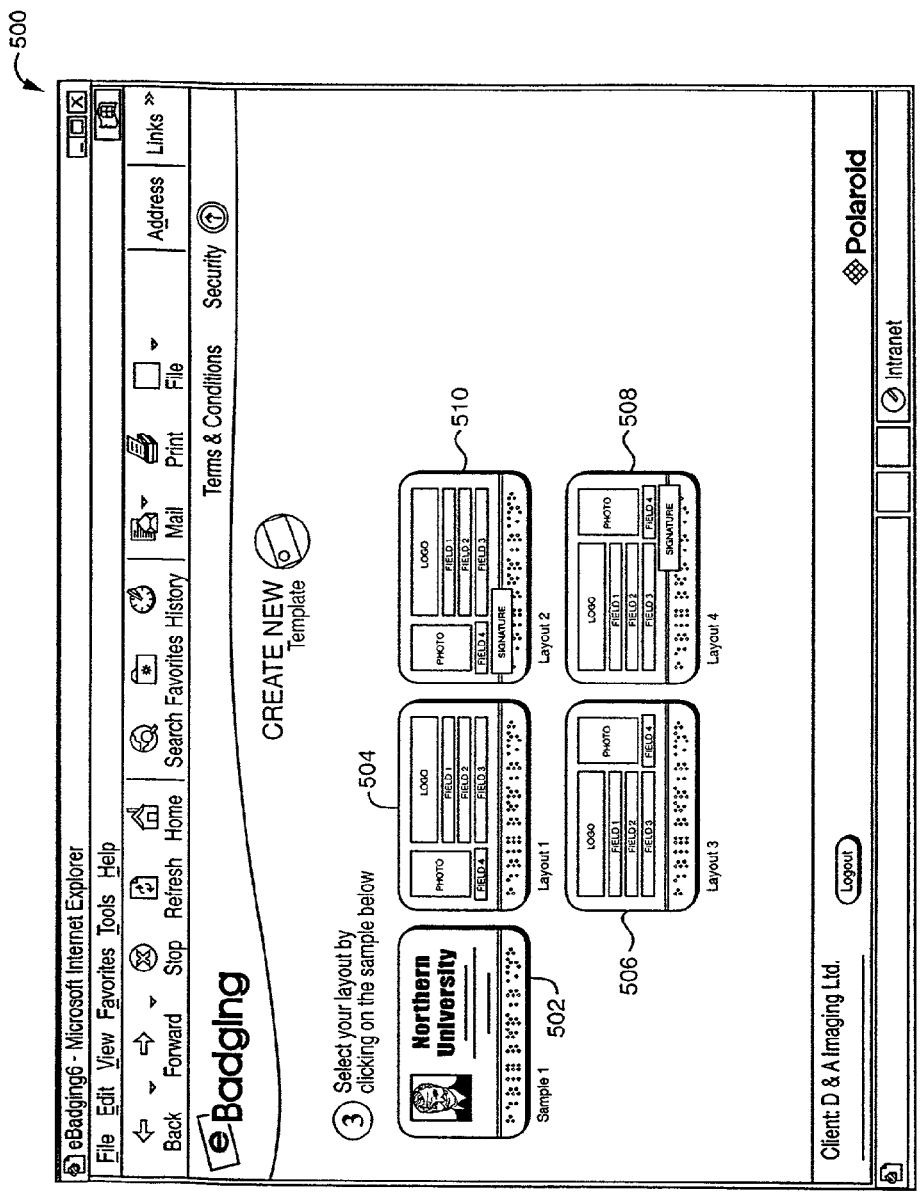
FIG. 5 is an exemplary web page illustrating the layout options available in the data gathering module.

FIG. 5 shows a web page 500 that illustrates various layouts based on the above choices. For example card 504 illustrates an identification document having a photograph on the left side, company logo on the right side, 4 fields of data, and no signature. Card 506 illustrates a card having a photo on the right side, company logo on the left side, 4 fields of data, and no signature. Card 508 illustrates a card having a photo on the right side, company logo on the left side, 4 fields of data, and a signature on the right side. Card 510 illustrates a card having a photo on the left side, a company logo on the right side, 4 fields of data, and a signature on the left side.

Figure 6:
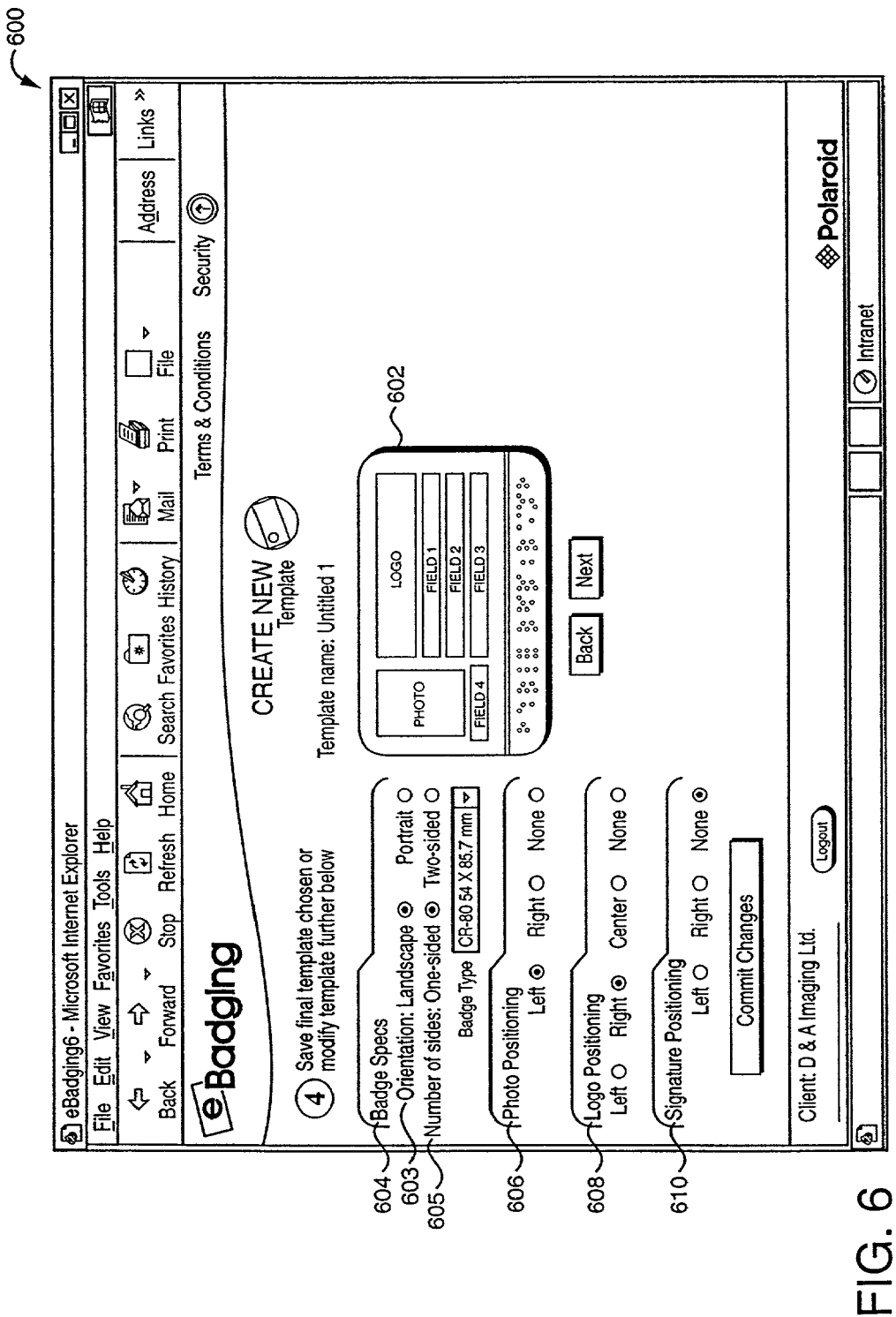
FIG. 6 is an exemplary web page illustrating a second embodiment of the layout options available in the data gathering module.

FIG. 6 illustrates one embodiment of identification document design guidance data. In one embodiment a computer web page 600 provides the user with various choices concerning the design of their identification document. Badge specs selection 604 allows the user to select an orientation 603 and number of sides to be printed upon 605. In the illustrative embodiment the orientation may be either landscape or portrait in the identification document to be printed on one or two sides. A choice of photo position provided in section 606 in the illustrative embodiment may be either positioned to the left or to the right of the middle of the identification document. If the user desires, identification document may be produced without using a graphical representation of the person for whom identification document is being made. If a company logo is to be included on the identification document section 608 provides positioning information for it. The company logo may be placed on the left, right, or center of the identification document. If a signature is to be used on the badge its location may be selected as well in section 610 and may be on either the left or right side of the identification document.

As described above, payment module 110 collects and securely stores payment data from the user. In one embodiment this payment data may include the shipping address of the Company to which the identification documents will be shipped. In addition, various forms of payment information may be collected as well. In one embodiment, for example, credit card data which may include the type of credit card, credit card number, name on the credit card, the amount of the purchase, and expiration date of the credit card may be collected in order to affect the credit card purchase. In another embodiment debit card information may be collected which may include bank name, debit card number, expiration date, authorized user, and the amount. In another embodiment data consistent with electronic transfer of funds may be collected. This may include for example the bank routing number and account number to which the money will be transferred to and from. In another embodiment a purchase order number may be used to guarantee payment.

As discussed above, user verification module 126 retrieves the location of the user and verifies that user is a legitimate organization. By verifying the legitimacy of the user illegal uses of identification documents produced using this system and method may be reduced or avoided entirely. In one embodiment the user verification module 126 can include a database of business addresses and corresponding telephone numbers. The location of the user that is retrieved from the payment data, or other user supplies information, is crossed check with the data stored in the database in order to ascertain the legitimacy of the organization. In another embodiment an operator of this system may offline search the Internet, telephone directories, or other printed or electronic materials in order to cross check the information provided by the user. In another embodiment the user verification module 126 may access databases such as those owned and operated by Dunn & BradStreet to cross check the address of the user.

In another embodiment of the present invention system 100 can also include security feature design module 106 coupled to server 102. Security feature design module 106 can be a computer application running on a processor or computer remote to server 102 and may be coupled to server 102 through an Internet network connection, intranet network connection, or dial-up modem connection. Alternatively, security feature design module 106 may also be a computer application running locally on server 102 under the control of the local server operating system. Security feature design module 106 can be written and compiled in a high level language such as Java, C, C++ or other computer language. Similarly, security feature design module 106 can be written in an interpreted language such as Java Script, Visual Basic, or CGI Script. The actual implementation is considered to be within the skill of one of ordinary skill in the art.

Security feature design module 106 is configured and arranged to provide the user with data regarding various types of security features that may be included on the card, and the advantages and disadvantages of the various security features. In addition, security feature design module 106 will, if the user desires to include one or more security feature in their identification documents, prompt the user for security feature design data and will securely store the security feature design data in a user security feature database.

Various types of security features can be included. In a preferred embodiment service bureau 112 will be automated and will use standard identification document paper stock that does not include any preprinted information. This allows identification documents of multiple users to be printed in any order since there is no special pre-processing to be performed. As such, in a preferred embodiment security features such as watermarks that must be preprinted on the identification document stock are not used. Thus, security features that can be printed or laminated onto the surface of the identification document are preferred. Examples of security features may include: magnetic stripes that are encoded with a particular code, one and two dimensional bar codes where the bar code is encoded with security or personal information, micro-printing of characters on the surface of the card, and laminating security features onto the card that are visible only under UV illumination. The above list is not meant to be limiting and it would be obvious to one of ordinary skill in the art to include other security features as well.

In another embodiment, system 100 may include user registration module 130 coupled to server 102. User registration module 130 can be a computer application running on a processor or computer remote to server 102 and may be coupled to server 102 through an Internet network connection, intranet network connection, or dial-up modem connection. Alternatively, user registration module 130 may also be a computer application running locally on server 102 under the control of the local server operating system user registration module 130 can be written and compiled in a high level language such as Java, C, C++ or other computer language. Similarly, user registration module 130 can be written in an interpreted language such as Java Script, Visual Basic, or CGI Script. The actual implementation is considered to be within the skill of one of ordinary skill in the art.

User registration module 130 is configured and arranged to prompt the user to supply user data of various aspects of the user and their organization and to securely store the user identification data in a user identification data database. The user data that is to be collected should be data that is useful to the functioning of system 100 and will further the marketing of system 100 by providing information necessary to identify classes of users that use system 100 and to identify any class of options not currently available that users would benefit from. In an alternative embodiment system 100 can provide a e-mail link from the user to provide other comments and criticisms as well. Examples of user data that may be collected include: the name of the user, e-mail address of the user, name of the organization, address or location of the organization, telephone number of the user and organization, size of the organization, type of products or services provided by the organization, annual revenues of the organization, and the number of employees at various locations or plants of the organization. The above list is not meant to be limiting and it would be obvious to one of ordinary skill in the art to collect other user data as well.

Figure 7A:
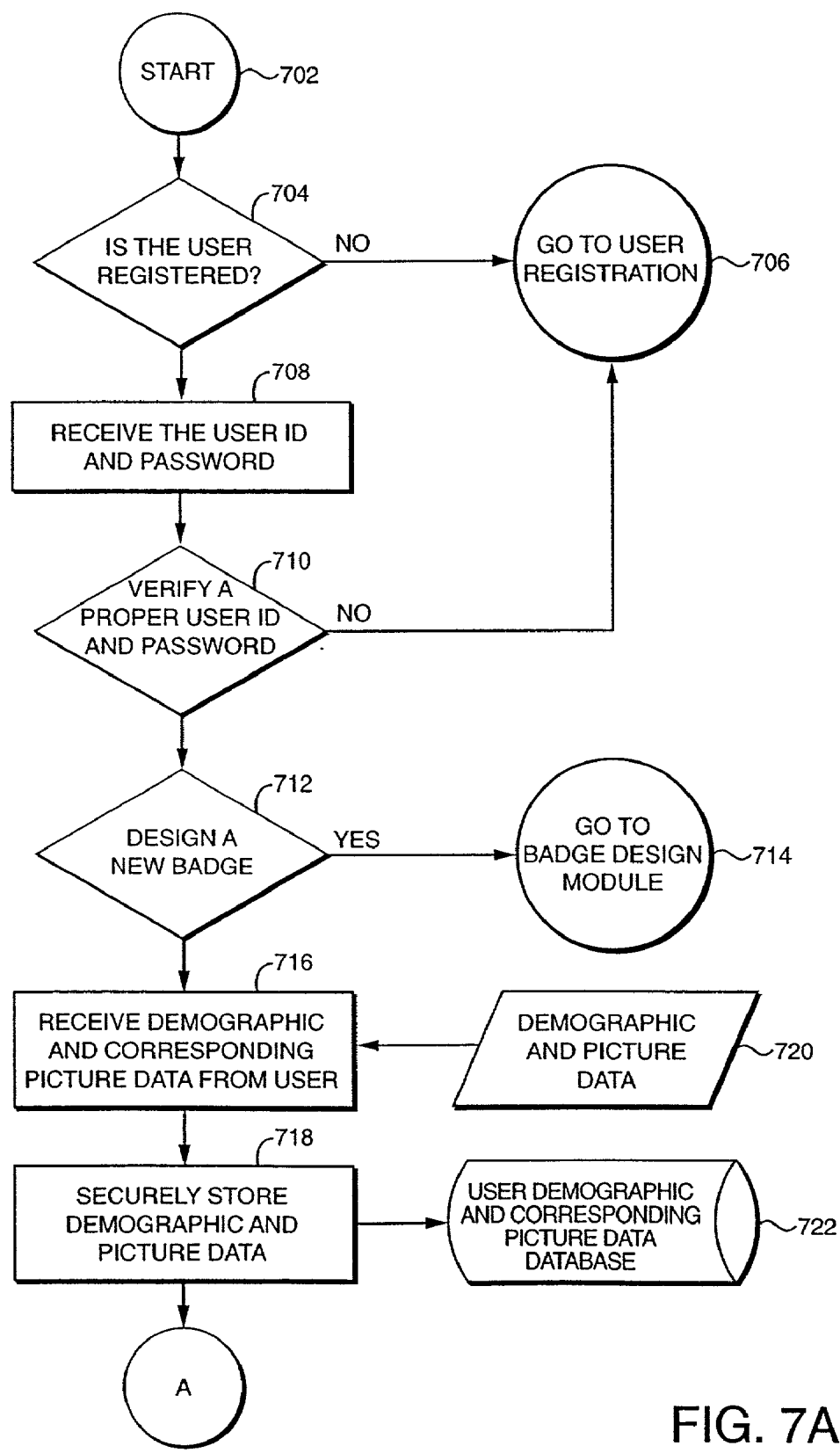
FIGS. 7A–7C are flow charts illustrating one method of performing the present invention.
Figure 7B:
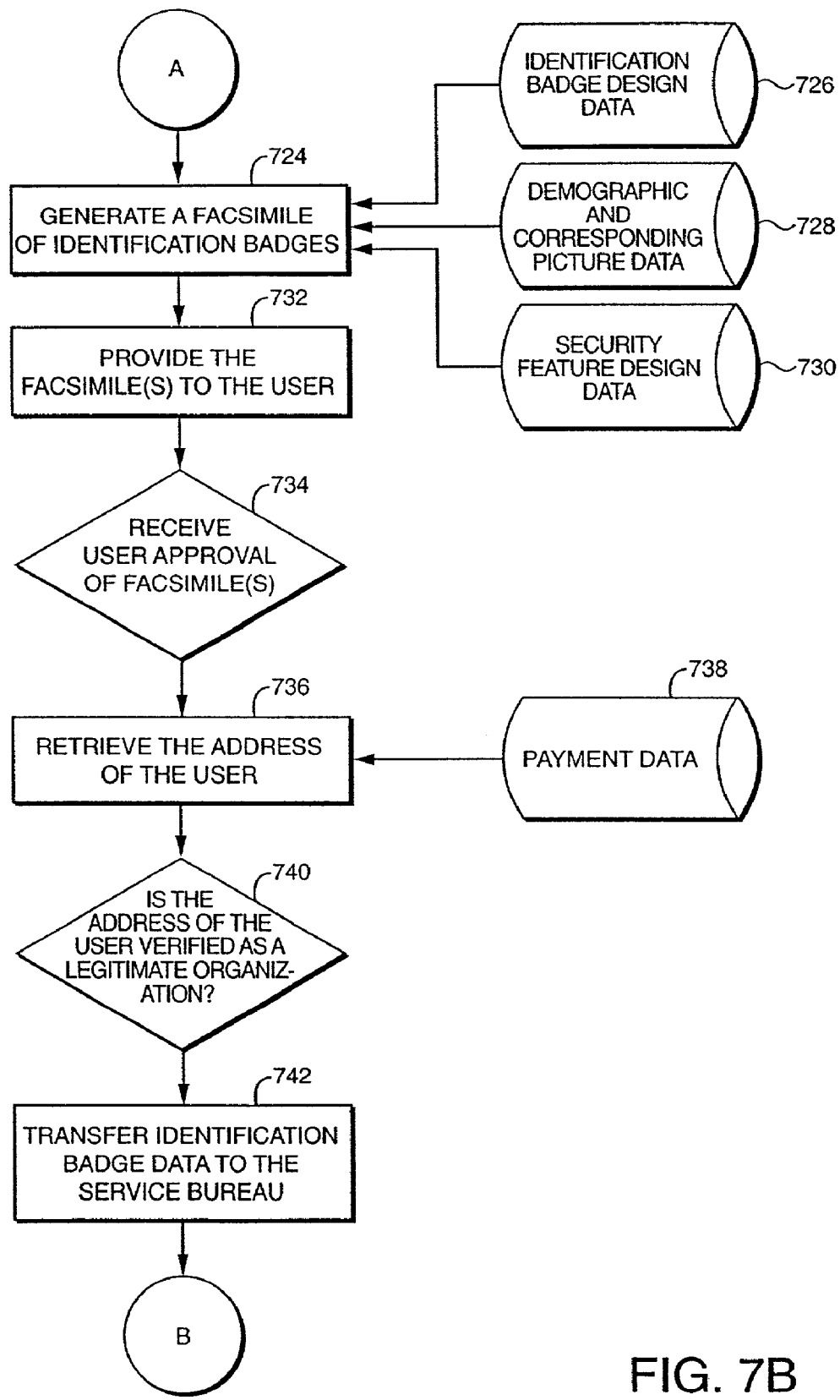
Figure 7C:
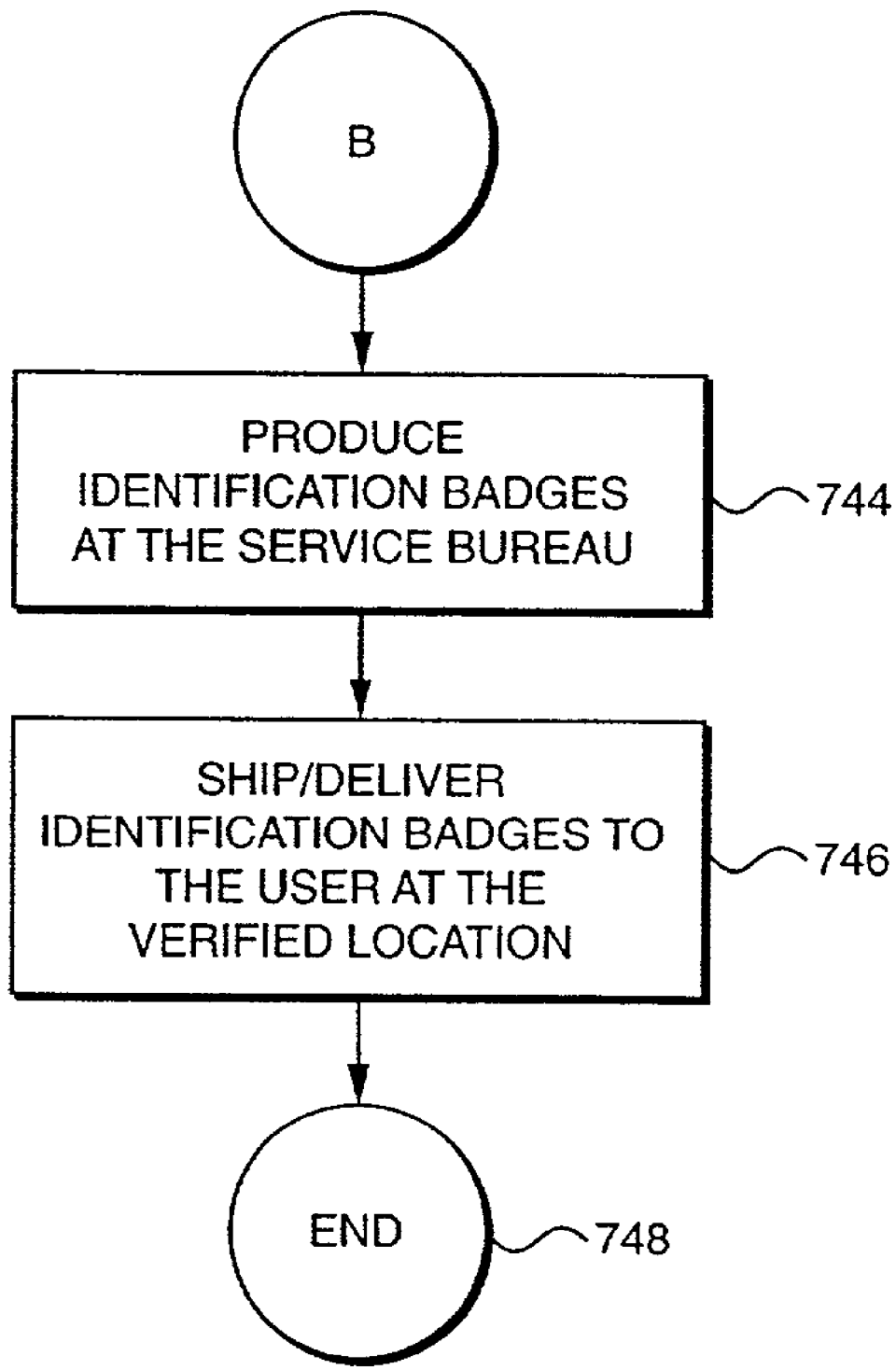

FIGS. 7A–7C illustrate one method for performing the present invention. Beginning with step 702, a user has accessed a web based application via the Internet (not shown) and the system first determines if the user is a registered user, step 704. If the user has not previously registered they are sent to the User Registration Module in step 706. If the user has previously registered, their User ID and Password are verified in step 710. If the User ID and Password are invalid, the user is sent to the User Registration Module, step 706. If the user is properly verified, the user is given a choice between designing a new identification badge and using an existing identification badge design, step 712. If a new identification badge is desired, the user is sent to the identification badge design module step 714. If an existing identification badge design is to be used, the system receives demographic data and the corresponding picture data from the user, step 716. The user supplies the data (step 720), and the system securely stores the demographic data and the corresponding picture data database (step 722). The system retrieves data from the identification badge design database, step 726, the user demographic data and the corresponding picture data database, step 728, and the security feature design data base 730 and creates a facsimile of the identification badge or badges that the user has provided data for, step 732. These facsimiles are provided to the user for their approval, step 732. If the user does not approve one or more of the facsimiles, the user is requested to enter new demographic data and/or picture data for particular identification badges, step 716. If the user approves the facsimiles, the address or location of the user is retrieved, at step 736, from the user payment data 738, and is verified as to the legitimacy of the location, step 740. This verification can be performed automatically by consulting a database of known legitimate organizations (not shown). If the user address is not legitimate, the system ends and will not produce the identification badges for the user. If the user address is legitimate, the identification badge data is transferred to the service bureau 742. This data includes data in the identification badge design database, the user demographic data and the corresponding picture data database, and the security feature design database. The service bureau proceeds to produce the identification badges according to the received data, step 744. In one embodiment, the identification badge data representing the completed and printed identification badges can be stored in a secure database for the user (not shown). The identification badges are then shipped or delivered to the user location or address, step 746, and the system ends, at step 748.

Figure 8A:
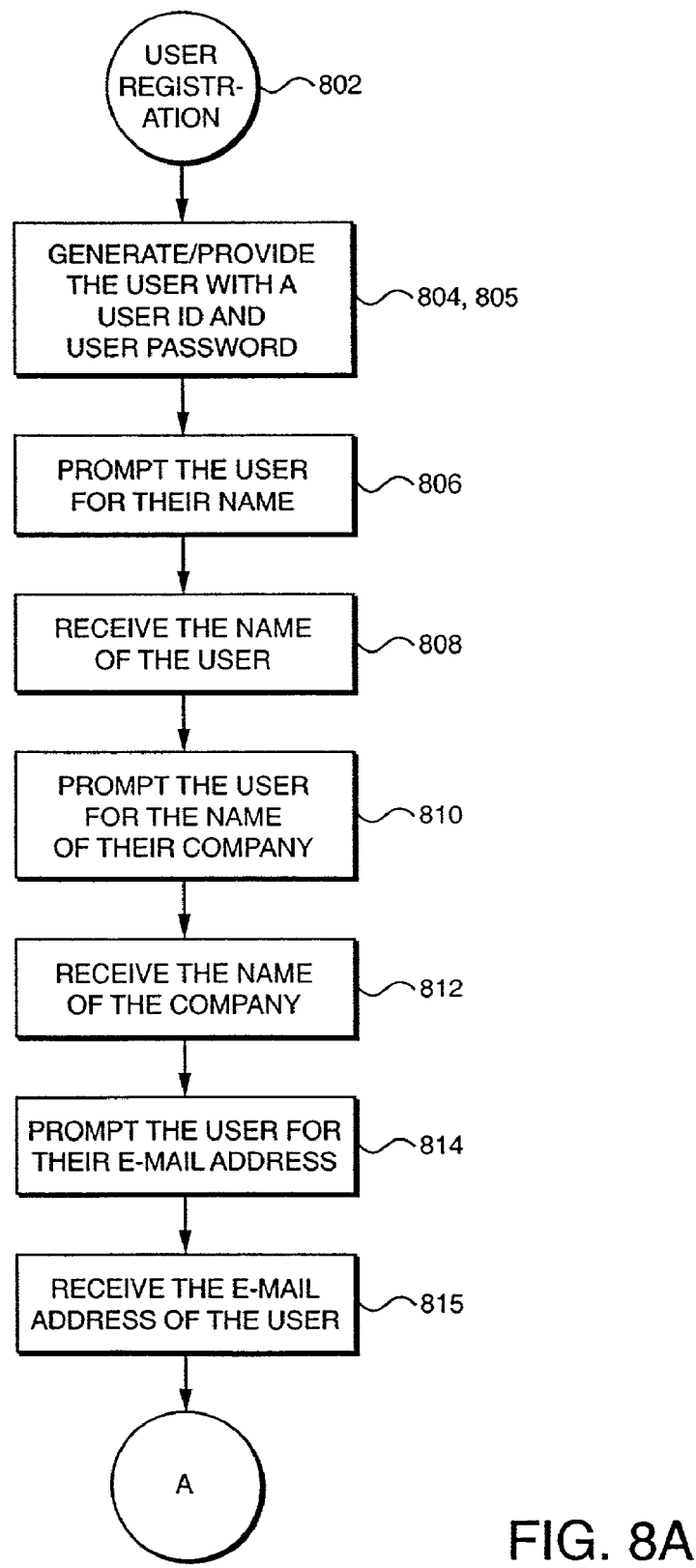
FIGS. 8A–8C are flow charts illustrating one method of performing the user registration function.
Figure 8B:
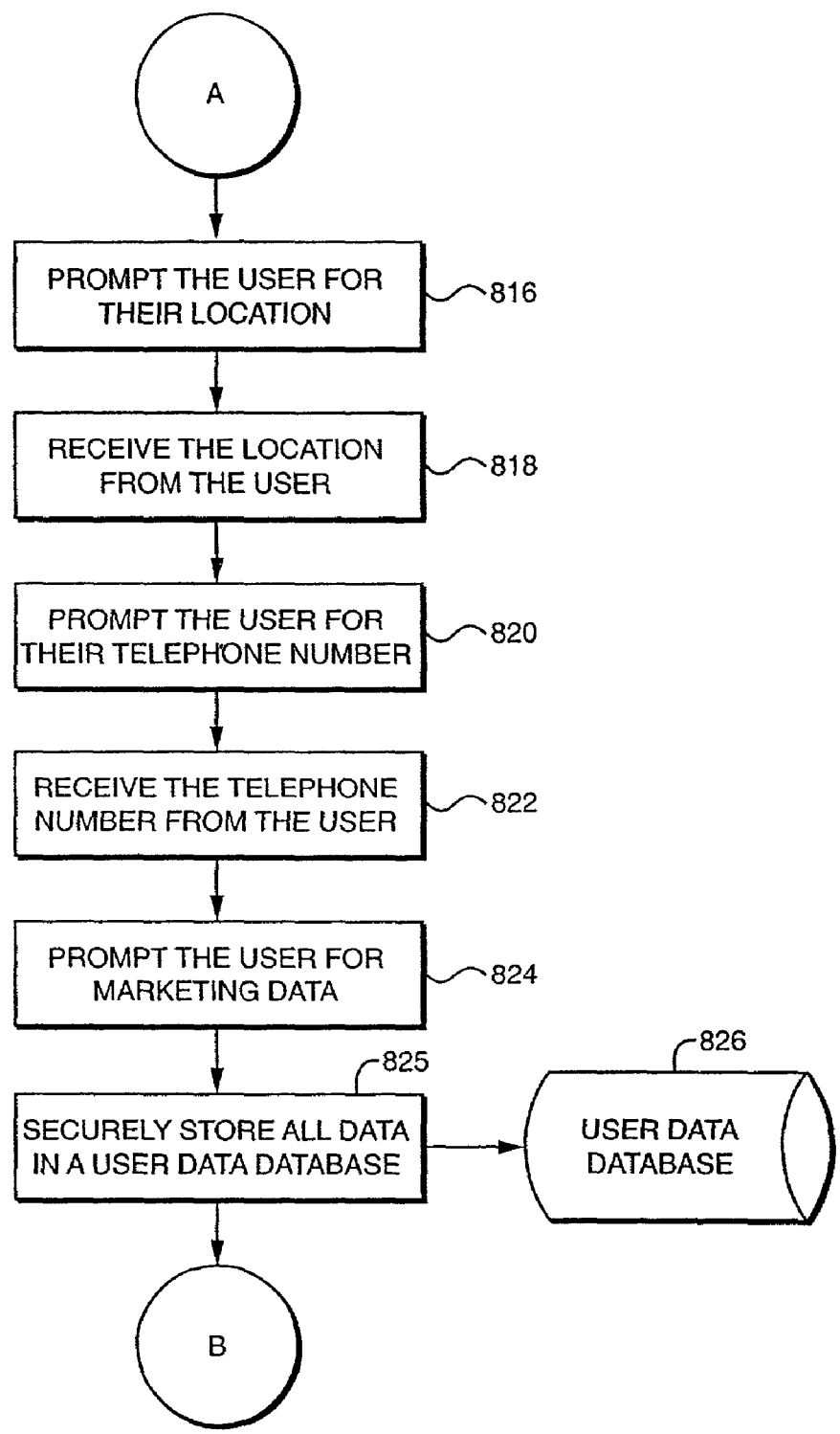
Figure 8C:
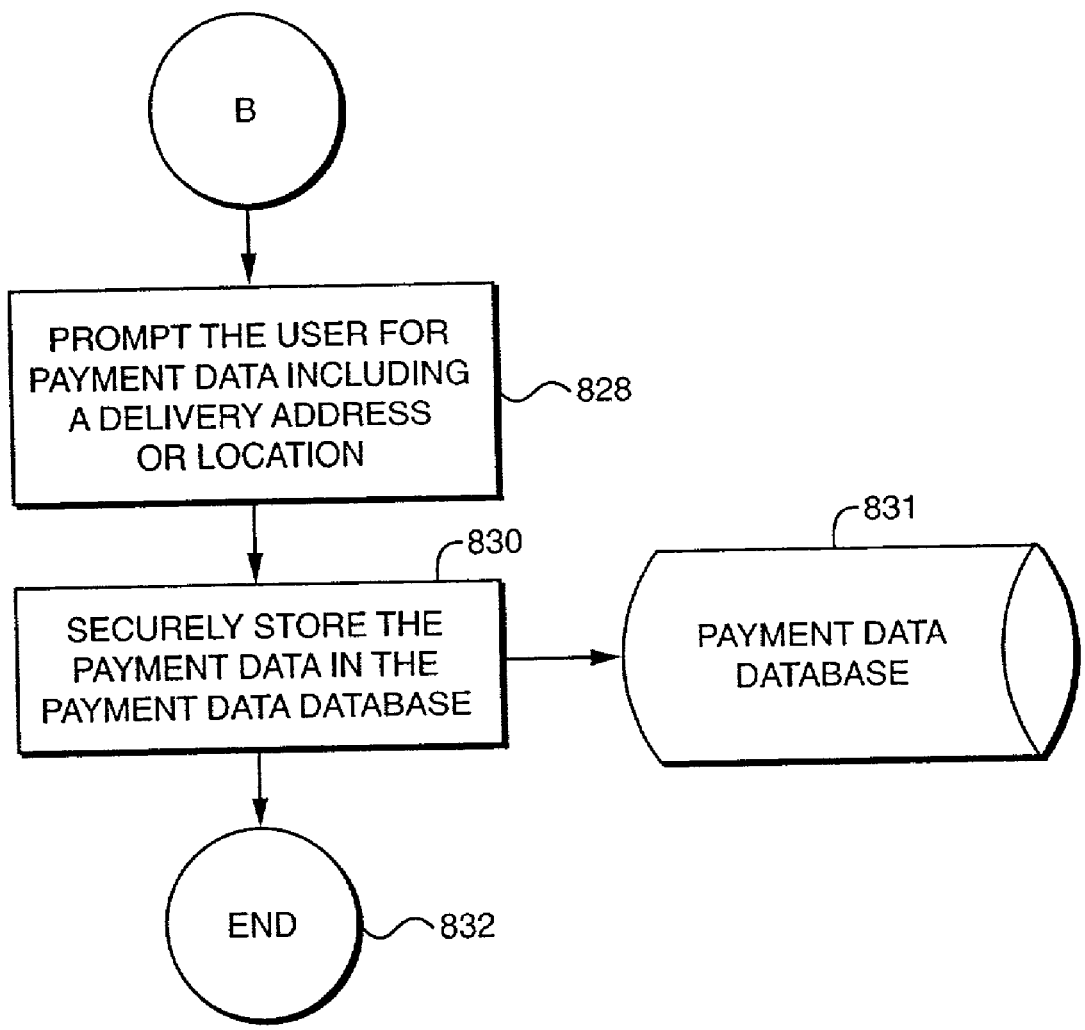

FIGS. 8A–8C illustrate one method for performing the user registration. Beginning in step 802, a user ID and password are generated, step 804 and provided to the user, step 805. The user is then prompted to provide and receive pertinent data for their profile: their name at steps 806, 808; the name of the company for which the user works at steps 810, 812; the e-mail address of the user at steps 814, 815; the location or address of the user at steps 816, 818; the telephone number of the user at steps 820, 822; and marketing information about the company at steps 824, 825. The marketing information may vary and the selection of the marketing information would be considered to be obvious to one of ordinary skill in the art. The user is also prompted to supply and store payment data at steps 828, 830; and this payment data preferably includes an address or location to which the identification badges should be shipped. The payment data is securely stored in the payment data database 831. The user data is securely stored in a user data database, step 826. The user registration ends in step 832.

Figure 9:
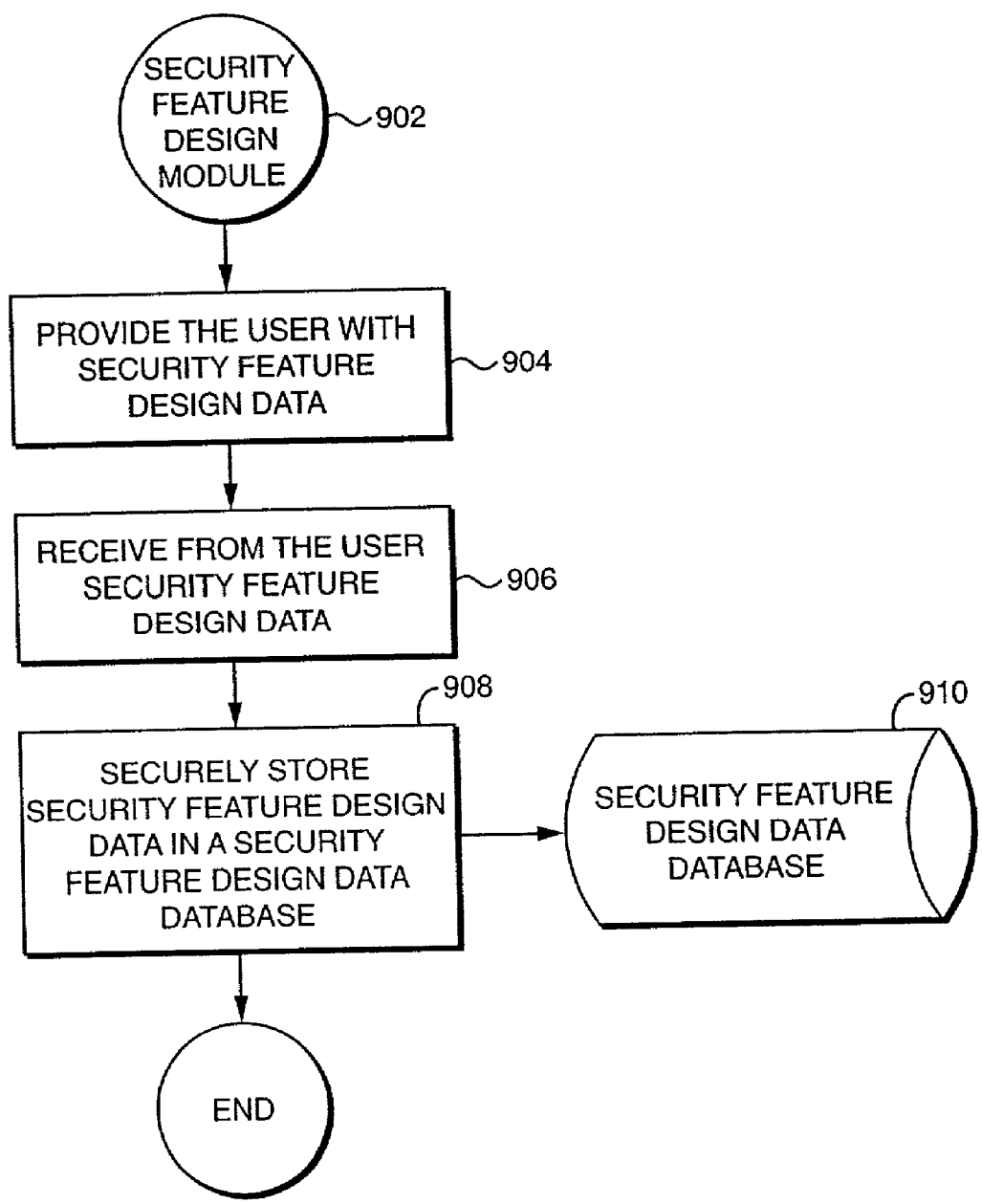
FIG. 9 is a flow chart illustrating one method of performing the security feature design guidance function.

FIG. 9 illustrates one method for the design of security features to be included on the identification badges. Beginning in step 902, the user is provided with data concerning the various security features available, step 904. These features can include magnetic stripes, one and two dimensional bar codes, micro-printing, and the UV visible security features printed or laminated onto the identification badge. The system receives and stores the security features data selected by the user at steps 906, 908, in a security feature design data database 910.

Figure 10A:
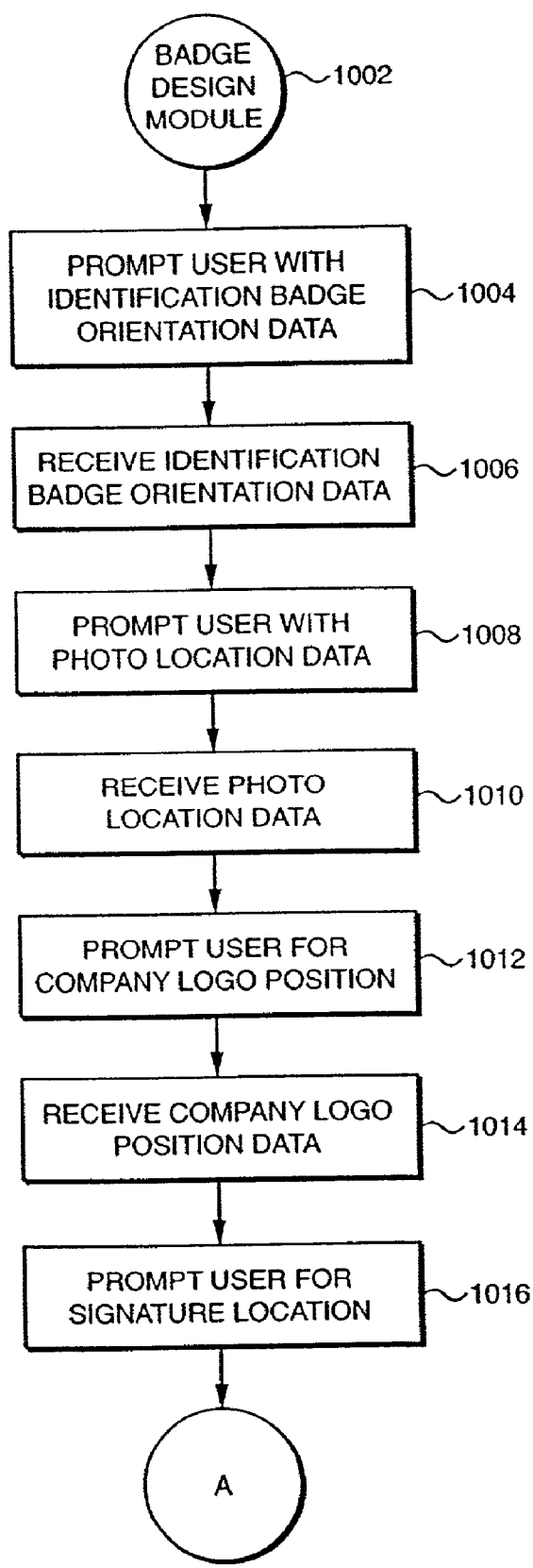
FIGS. 10A–10B are flow charts illustrating one method of performing the identification document design guidance function.
Figure 10B:
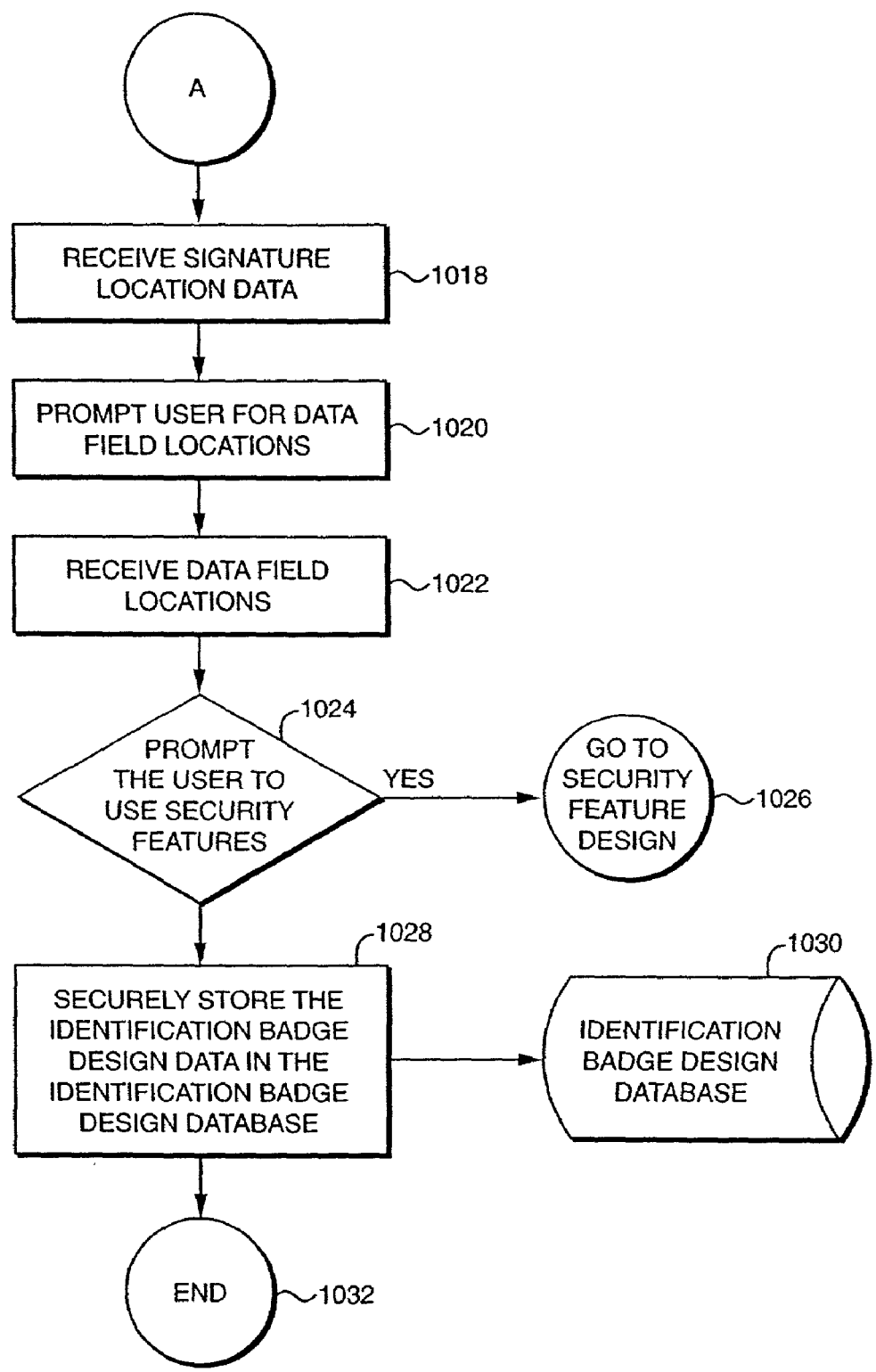

FIGS. 10A–10B provide a method for designing an identification badge. Beginning in step 1002, the user is prompted to provide data concerning the layout and design of the badge. The user is prompted to and provides data for the identification badge orientation, steps 1004, 1006; the user is prompted to and provides data for the photo location on identification badge, steps 1008, 1010; the user is prompted to and provides data for the location of the company logo or trademark on identification badge, steps 1012, 1014; the user is prompted to and provides data for the location of the signature on the identification badge, steps 1016–1018; the user is prompted to and provides date for the other data field locations on the identification badge, steps 1020, 1022. If the user desires one or more security features, the user is prompted, step 1024, and sent to the security feature design module step 1026. If the user does not desire security features, the identification badge design data is securely stored at step 1028 in the identification badge design data database, step 1030. The method ends at step 1032. While the invention has been described with reference to particular embodiments, it will be understood that the present invention is by no means limited to the particular constructions and methods herein disclosed and/or shown in the drawings, but also comprises any modifications or equivalents within the scope of the claims.

The invention claimed is:

1. A system generating and ordering an identification document over network, the system comprising: user interface connected network communication with a server also coupled the network; data gathering module coupled to said server, said data gathering module for prompting a user to provide at least one demographic data and corresponding graphical representation and receiving and securely storing said at least one demographic data and said corresponding graphical representation in a user demographic and picture data database coupled to said server; an identification document design module coupled to said server, said design module for providing identification document design guidance data to said user and thereby prompting said user provide identification document design data, the design module capable of receiving and securely storing identification document design data a document design data base coupled to said server; a payment module coupled to said server, said payment module for prompting the user to provide payment data and receiving and securely storing said payment data said user database, said payment data including user location data and user payment data, said payment data being utilized to verify that payment for said identification document has been made and to provide a paid-in-full signal upon said verification; user verification module coupled said server, said user verification module for retrieving said user location data, authenticating identity said user, and providing user verification signal upon successful user authentication; service bureau coupled to said server and responsive to said paid-in-full signal, whereby response to said paid-in-full signal and said user verification signal, said service bureau retrieves from said user data base said at least one demographic data and said corresponding graphical representation and retrieves from said document design data base said identification document design data, and produces a draft identification document incorporating said at least one demographic data and said corresponding graphical representation and said identification document design data; user approval module coupled said server, said user approval module for providing a facsimile of said draft identification document to the user over said server through said network, and prompting the user to provide a job-acceptance signal; said service bureau providing a final identification document to said user in response to said job-acceptance signal, said final identification document being the equivalent of an approved said draft identification document.

2. The system as claim wherein said data gathering module, said identification document design module, said payment module, said service bureau, said user approval module and said user verification module, are coupled said server by one of the following group consisting of an Internet network connection, an intranet network connection, a dial-up modem connection, and further wherein each module includes plurality of computer processor instructions that can be executed by computer processor located within said server and at least one processor remote from said server, wherein said computer processor instructions are compiled instructions written one the group computer languages consisting of C, and Java and are interpreted instructions written one the following group of computer languages consisting of visual basic, Java script, CGI script.

3. The system as in claim 1, wherein said at least one demographic data includes: the name of an employee, the name of a company, the employee number, the address of a company, the telephone number of a company, a security clearance level.

4. The system as in claim 1, wherein said corresponding graphical representation can include a digitally encoded picture, and a digitally encoded fingerprint.

5. The system as in claim 1, wherein said securely storing said at least one demographic data and said corresponding graphical representation includes encrypting said at least one demographic data and said corresponding graphical representation using a password to generate a plurality of password encrypted data.

6. The system as in claim 1, wherein said identification document design guidance data includes: a plurality of identification document orientation data including portrait and landscape orientations; a plurality of location data for placement of said graphical representation; a plurality of location data, orientation data, font type data, font size data for placement of said at least one demographic data on said identification document; a plurality of special printable indicia of security clearance level data; and a plurality of data for printing on both sides of said identification document.

7. The system as in claim 1, wherein said payment data includes: a shipping address; credit card information necessary authorize a credit purchase; debit card information necessary to authorize a debit purchase; electronic transfer authorization information necessary to authorize a credit purchase; and a purchase order number.

8. The system as in claim 1, wherein said user verification module includes a database containing a plurality of business addresses and corresponding telephone numbers, wherein said location of the user is cross-checked with said business address and telephone numbers in said data base.

9. The system as in claim 1, further comprising: a security feature design module configured and arranged to provide the user with security feature design guidance data and to prompt the user to provide security feature design data, said security feature design wizard securely storing said security feature design data in a user security feature database wherein said security feature design guidance data includes data directed to: an encoded magnetic stripe; a one-dimensional bar code; a two-dimensional bar code; micro-printing one or more characters; one or more UV visible security features printed on said document; and to securely store said security feature design data in a password encrypted file.

10. The system as in claim 1, further comprising a user registration module coupled to said server configured and arranged to query the user to provide at least one user data, and configured and arranged to receive said at least one user data and to securely store said at least one user data; wherein said at least one user data includes: a name of the user; a name of a company associated with the user; a location of said company associated with the user; a telephone number associated with the user; an e-mail address associated with the user.

11. A method user to order customized identification documents over a network connected to a user interface in communication with a server coupled to the network, the method comprising the steps of providing the user with a plurality of badge design guidance data; receiving a plurality of design badge data from the user; storing said plurality of design badge data; prompting the user provide least one demographic data for incorporation into said identification document; receiving said at least one demographic data for incorporation into said identification document prompting the user to provide at least one graphical representation corresponding said at least one demographic data for incorporation into said identification document; receiving least one graphical representation corresponding to said at least one demographic data for incorporation into said identification document; securely storing said at least one demographic data and corresponding at least one graphical representation; creating at least one facsimile of an identification document incorporating said plurality of design badge data and including said at least one demographic data and corresponding least one graphical representation; providing said at least one facsimile to the user; prompting the user to approve or not approve the facsimile; receiving the approval or not approval from the user; if approval is received and then no payment data stored then prompting the user for payment and location information, otherwise retrieving stored payment data including said location information; if approval is received and no payment data is stored then receive said payment and location information; approval is received then verifying that said location information is legitimate organization; if approval is received then verify using said payment information that a payment has been received; approval received and the location information is verified, and a verified payment has been received then manufacturing said least one identification document corresponding to the approved at least one facsimile; delivering said location said least one identification document to the user.

12. The method as in claim 11, further comprising the steps of:
provide the user with a user id and password;
prompting the user to provide at least one user data;
receiving said at least one user data; and
securely storing said at least one user data.

13. The method claim wherein the step of verifying that said location is a pre-approved organization includes: retrieving said location information; cross checking said location information with database of known pre-approved organizations.

14. The method of claim 11, further comprising the steps of:
providing the user with a plurality of security feature design guidance data;
receiving from the user a plurality of security feature design data; securely storing said security feature design data in a security feature design data database.

* * * * *